Patented Oct. 21, 1941

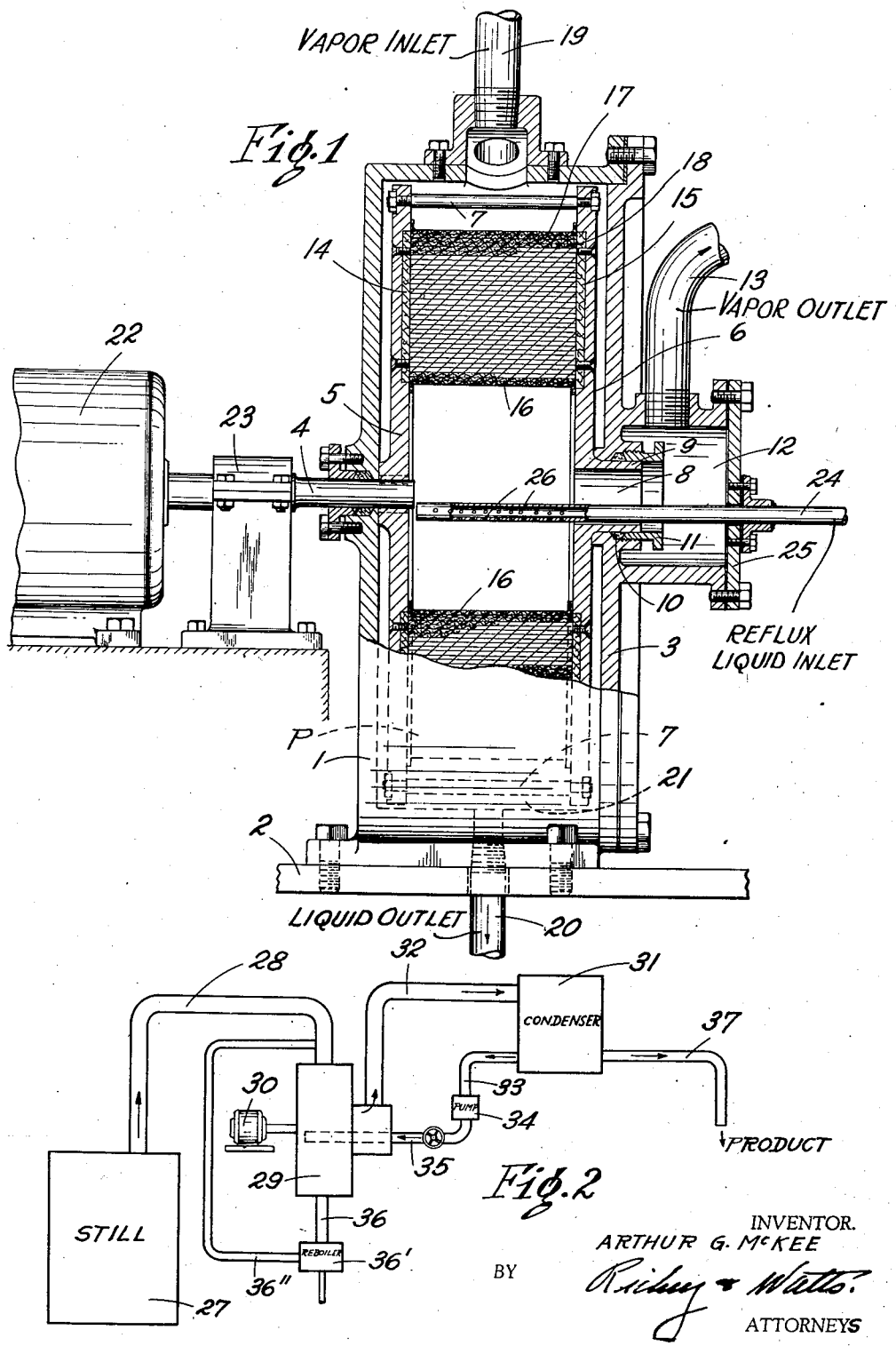

2,259,762

UNITED STATES PATENT OFFICE 2,259,762

FRACTIONATING METHOD AND APPARATUS THEREFOR

Arthur G. McKee, Cleveland, Ohio

Application July 1, 1938, Serial No. 217,086

10 Claims. (Cl. 202—39)

This invention relates to an improved method of and apparatus for causing intimate contact between a liquid and vapors or gases and more particularly to an improved fractionating method and apparatus especially adapted for use in the refining of petroleum products.

As is well known to those skilled in the art, fractional distillation or fractionation may be carried out either by means of a bubble tower comprising a vertically extending shell having a series of trays over which the liquid flows in a downward direction under the influence of gravity, the vapors bubbling through the liquid on the trays as they pass up through the tower, or a packed tower in which a vertically extending vessel is packed with filler bodies, such as Raschig rings, etc., through and over which the liquid is caused to pass under the influence of gravity and through which the vapors pass in their upward travel through the tower.

Experience indicates that about the smallest size pores which will give satisfactory results in a packed tower are those formed by packing the tower with ½" Raschig rings and, as is pointed out on page 1196 of Perry's Hand Book of Chemical Engineering, it takes a layer of these rings between 8" and 16" high to give a fractionating efficiency which equals one theoretical fractioning plate. It has been determined that the smaller the pores in a packed tower the smaller the height of packing required to equal a theoretical plate. However, as the only force available to cause the reflux to pass over and through the pores is gravity, the size of the pores which can be successfully used without objectionable flooding of the tower is limited in actual practice to ½" Raschig rings or their equivalent. Thus, a packed tower which has a fractionating efficiency equal to 30 theoretical plates must be a very tall structure and is necessarily expensive. If the reflux is charged too rapidly in a packed tower the tower may flood and fractionating efficiency be seriously impaired. If vapor is passed upwardly through the pores too rapidly in an attempt to increase the capacity of the tower the reflux liquid may be held up and prevented from passing down through the packing. This, of course, renders the tower inoperative. Channeling of the vapor through the packing is another objectionable possibility in the operation of a packed tower. When channeling occurs the vapors pass through only a portion of the packing and the capacity and efficiency of the tower is greatly reduced. This is one of the most serious troubles encountered in the commercial operation of packed towers and it is largely eliminated by my improved apparatus.

Bubble towers for commercial operation are also necessarily large and expensive structures, 30-plate towers necessarily being 60 or more feet in height and, as each plate must contain a number of bubble caps, the cost of such a tower is relatively high.

My present invention contemplates an apparatus for and method of causing intimate contact between liquids and vapors whereby the fractionating effect and capacity of standard packed towers or bubble towers of as much as 30 theoretical plate capacity or more can be obtained by means of a very small, efficient and economical mechanism which can be housed in a small space and requires a minimum of upkeep. It is among the objects of my invention to provide an apparatus for carrying out fractional distillation or fractionation which will have the capacity and efficiency of the present day fractionating tower structure but which will be small, compact and economical of construction and upkeep. Other objects of my invention are the provision of an improved apparatus for causing the efficient contact of liquids and vapors or gases in which centrifugal force is utilized to create the desired flow of liquid and in which extremely small pores or voids may be used in the packing of the device thus greatly reducing the thickness of the packing required to achieve fractionating results equal to that of a theoretical plate.

The above and other objects of my invention will appear from the following description of one form of apparatus which is adapted to carry out my improved process, reference being had to the accompanying drawing, in which—

Figure 1 is a vertical cross-sectional view through one of my fractionating units.

Figure 2 is a diagrammatic layout of the essentials of a fractionating plant embodying my improved centrifugal fractionator.

Broadly speaking a preferred embodiment of my invention includes a rotatable annular mass of packing material forming a packed space, the pores of which are of such small size that a small radial thickness thereof will achieve a fractionating efficiency equal to one theoretical fractionating plate. In the illustrated apparatus a generally cylindrical housing 1 may be mounted on a suitable base 2. A side cover plate 3 forms one side of the housing 1 and a rotatable packing unit P is mounted on the shaft 4 which extends through the housing 1. The packing unit comprises a pair of side plates 5 and 6, the plate 5 being secured to the shaft 4 and the plate 6 being secured to and spaced from the plate 5 by means of the spaced bolts 7. A vapor outlet opening 8 is provided at the center of the plate 6 and this outlet is provided with a tubular extension 9. Packing 10 is held in position by a suitable gland 11 which is threaded into the cover plate 3 of the housing. The packing provides a seal between the plate 6 and the housing 1 to prevent the passage of vapor or liquid therebetween. A vapor outlet chamber 12 is provided adjacent the outlet 8 and the pipe 13 extends from the outlet chamber 12 and is adapted to conduct the vapors to a condenser or the like, as will be later explained.

Each of the discs or plates 5 and 6 is preferably provided with heat insulating means, such as the annular plates 14 and 15. These plates may be made of Bakelite or other material having low heat conducting properties. In the illustrated embodiment of my invention inner and outer rings 16 and 17 of wire screening or the like extend across between the side discs 5 and 6 and are secured thereto by any suitable means such as welding or brazing. The annular space between the perforate rings 16 and 17 is filled or packed with any suitable material which will provide the desired small pores or voids whereby the intimate contact of the vapor and liquid is obtained. Among the various useable materials to create the desired packed space or porous mass may be noted fine wire mesh screening, such as 80 mesh copper screening, indicated at 18 in Figure 1, metallic wool, rock wool or particles of substances disposed between radially spaced rings such as 16 and 17 and having voids between the particles.

A vapor inlet pipe 19 extends into the top of the housing 1 and a liquid outlet pipe 20 is adapted to conduct the used reflux or bottoms from the fractionating chamber 21. A variable speed motor 22 is connected to drive the shaft 4 which is provided with an external bearing 23. Of course, any other suitable means may be provided for driving the shaft 4 and the rotor. Preferably such means should be adapted to speed variations over a considerable range so that the rotation of the rotor may be controlled to give the desired fractionating result.

The reflux liquid supply pipe 24 extends through the cover plate 25 of the vapor outlet chamber 12 and through the vapor outlet 8 into the central portion of the fractionating rotor P. A plurality of reflux outlets 26 are formed at the inner end of the pipe 24, the extreme inner end of which is preferably closed. In operation of the apparatus reflux liquid is forced through the pipe 24 and out through the openings 26 which distribute the liquid evenly over the surface of the inner packing retaining ring 16.

Figure 2 illustrates diagrammatically an arrangement of equipment in which my improved centrifugal fractionator is utilized. Vapors from the still 27 pass through the pipe 28 to the centrifugal fractionating unit 29 which is driven by the motor 30. After the vapors have passed through the unit 29 they are led to the condenser 31 by the pipe 32. Reflux liquid from the condenser 31 passes through a pipe 33 to the pump 34 which in turn forces it into the fractionating unit 29 through the pipe 35. The liquid outlet from the unit 29 is through the pipe 36 and product may be withdrawn from the condenser 31 through the pipe 37. The bottoms discharged through the pipe 36 may enter a reboiler 36' and the vapors driven off therein be returned to the unit 29 through the pipe 36''.

In the operation of my improved fractionator the mixed vapors under pressure are directed into the chamber 21 through the pipe 19, reflux liquid being directed into the interior of the rotor through the pipe 24 and the rotor driven by the motor 22. As the vapors which enter the chamber through the pipe 19 can only escape therefrom through the passage 8, the chamber 12 and the pipe 13, they must necessarily pass radially inwardly through the porous mass of packing material 18. The reflux liquid which is directed out through the holes 26 of the pipe 24 strikes the screen 16 and, due to the rotation of the rotor assembly, is spread over the surface of the screen 16 from which it is moved by centrifugal force outwardly through the pores of the packing 18 in counter-current direction to the movement of the vapors therethrough.

As my fractionator is not dependent upon gravity for the flow of the reflux liquid, very fine pores in the packed space may be utilized and tests and calculations indicate that a radial thickness of approximately 12" of packed space of the type described, having an outside diameter of approximately 36", when rotated at a reasonable speed of less than 2000 R. P. M., could achieve the fractionating efficiency of at least 30 theoretical plates. In actual use of apparatus embodying my invention a rotor packed with a mass of concentric, closely spaced layers of #82 mesh screen having an outside diameter of 9" and a radial thickness of 1¼" was rotated at about 1700 R. P. M., and the fractionating equivalent of 4½ theoretical plates was obtained.

Having determined the diameter of the rotor and the thickness of the annular packing in the rotor necessary to achieve the desired fractionation, the capacity of the apparatus may be varied to suit requirements by merely making the distance between the end plates 5 and 6 greater or less. By increasing the axial length of the rotor and of the annular packing the capacity of the apparatus is proportionately increased and although the rotor of the apparatus illustrated in Figure 1 is rather short it will be understood that it may be made of any desired and practical length.

As carried out in the above described apparatus, my improved process of fractionating includes the steps of causing vapors of a volatile liquid to move into a packed space or porous mass under the influence of a pressure differential which is caused to exist between the vapor inlet to the enclosure for the packed space and the vapor outlet therefrom. Simultaneously with the flow of vapors into the packed space reflux liquid is caused to move into the packed space in a different direction, preferably directly opposite, from the direction of movement of the vapors under the influence of the pressure differential. Centrifugal force is employed to force the reflux liquid or condensate into the packed space from a different, and preferably opposite, surface thereof from the point of entry of the vapors.

It will be understood by those skilled in the art that as the vapors and reflux liquid mingle in the packed space or porous mass at least a part of the vapors of liquids of higher boiling temperatures than the temperature of the reflux liquid in the mass will be condensed into liquid and discharged by centrifugal force from their surface of entry, when in the vapor state, into the packed space. Also, at least a part of the reflux liquid which has a lower boiling temperature than the temperature of the vapors in the mass will be volatilized and discharged as vapor from the surface of entry of the liquid reflux. In other words, during fractionation in the packed space, a part of the vapors which enter the outer surface of the packing 18 will be condensed into liquid and will be thrown out by centrifugal force through the surface 17 along with a part of the entering reflux liquid. Another part of the reflux liquid which enters through the surface 16 will be volatilized in the porous mass and will be moved back through the mass under the influence of the pressure differential between inlet 19 and outlet 13 and pass out through the surface 16 so vaporized liquids and the so condensed vapors along with a part of the vapors which enter the mass through the outer surface 17.

By passing reflux liquid and vapors through a porous mass or packed space in counter-current relation and subjecting the reflux to centrifugal force in the manner described the even distribution of reflux liquid is facilitated, channeling of the vapors and flooding of the mass prevented and fractionating efficiency greatly increased over that of the gravity flow packed tower.

It will be understood that the form of the rotor, reflux feed, etc., may be modified from the particular arrangement shown and described herein and that other variations and modifications can be made in my invention without departing from the spirit thereof. I do not, therefore, wish to be limited to the specific procedure and apparatus described herein but claim as my invention all embodiments thereof coming within the scope of the appended claims.

I claim:

1. In fractionating apparatus of the type described, a housing, a rotor rotatably supported in said housing, said rotor including spaced discs and a porous packing disposed between said discs, inlet means for directing vapors into said housing externally of said packing, outlet means for withdrawing vapors from said housing after passing through said packing, means for preventing the passage of vapor from said inlet to said outlet without passing through said packing, means for withdrawing bottoms from said housing, a reboiler for said bottoms, and means for reintroducing vapors from said reboiler into said housing externally of said packing.

2. In fractionating apparatus of the type described, a housing, a rotor rotatably supported in said housing, said rotor including spaced discs and an annular porous packing disposed between said discs, inlet means for directing vapors into said housing externally of said annular packing, outlet means for withdrawing vapors from said housing after passing through said packing, means for preventing the passage of vapor from said inlet to said outlet without passing through said packing, means for discharging reflux liquid upon the inner surface of said annular packing, means for withdrawing bottoms from said housing, means for vaporizing at least a portion of the withdrawn bottoms, means for reintroducing said bottom vapors into said housing, and means for rotating said rotor.

3. In a process of separating substances having different boiling temperatures, the steps of moving liquids in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, and causing vapors to condense as they pass their condensing temperature zones.

4. In a process of separating substances having different boiling temperatures, the steps of moving liquids in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, and causing vapors to condense as they pass their condensing temperature zones, the so vaporized liquids and the so condensed vapors moving thereafter with the other liquids or vapors until they again change their phase to liquid or vapor and move in the opposite direction or until they move away from the irregular surfaces.

5. In fractional distillation in which reflux liquid is formed and then returned, the steps of forming heated vapors of a volatile liquid, causing reflux liquid at lower temperature than said heated vapors to move radially outwardly under the influence of centrifugal force and while so moving to pass through a packed space, passing said heated vapors inwardly through the reflux liquid in the packed space in counter-current relation thereto, condensing vapors which have passed through said reflux liquid and returning part of the condensate so formed to the packed space as reflux liquid.

6. In fractionating apparatus of the type described, a housing, a rotor rotatably supported in said housing, said rotor including spaced discs and an annular porous packing disposed between said discs, inlet means for directing vapors into said housing externally of said annular packing, outlet means for withdrawing vapors from said housing after passing through said packing, means for preventing the passage of vapor from said inlet to said outlet without passing through said packing, means for discharging reflux liquid upon the inner surface of said annular packing, means for withdrawing bottoms from said housing, means for vaporizing at least a portion of the withdrawn bottoms, means for reintroducing said bottom vapors into said housing, means for rotating said rotor, condensing means, means for conducting vapors from said outlet means to said condensing means, and means for conducting liquid condensate from said condenser to said means for discharging reflux liquid upon the inner surface of said annular packing.

7. In a process of separating substances having different boiling temperatures, the steps of moving liquid in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, causing vapors to condense as they pass their condensing temperature zones, withdrawing liquid which has passed over the irregular surfaces, vaporizing at least a portion of said withdrawn liquid, and passing the vapors of the withdrawn liquid through the interstices between the films on the irregular surfaces.

8. In a process of separating substances having different boiling temperatures, the steps of moving liquids in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, causing vapors to condense as they pass their condensing temperature zones, withdrawing liquid which has passed over the irregular surfaces, vaporizing at least a portion of said withdrawn liquid, passing the vapors of the withdrawn liquid through the interstices between the films on the irregular surfaces, condensing vapors which have passed through said interstices, and returning at least a part of the resulting condensate to said irregular surfaces.

9. In a process of separating substances having different boiling temperatures, the steps of moving liquids in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, causing vapors to condense as they pass their condensing temperature zones, the so vaporized liquids and the so condensed vapors moving thereafter with the other liquids or vapors until they again change their phase to liquid or vapor and move in the opposite direction or until they move away from the irregular surfaces, withdrawing liquid which has moved away from the irregular surfaces, vaporizing a part of said withdrawn liquid, and forcing the resulting vapors through the interstices between said irregular surfaces.

10. In a process of separating substances having different boiling temperatures, the steps of moving liquids in film form by centrifugal force over irregular surfaces, forcing vapors of higher temperature than said liquids through the interstices between the films on the irregular surfaces and in the opposite direction to the movement of the liquids, causing liquids to vaporize as they pass the temperature zones at which they boil, causing vapors to condense as they pass their condensing temperature zones, the so vaporized liquids and the so condensed vapors moving thereafter with the other liquids or vapors until they again change their phase to liquid or vapor and move in the opposite direction or until they move away from the irregular surfaces, withdrawing vapors which have moved away from said irregular surfaces, condensing at least a part of such withdrawn vapors, and moving at least a part of the resulting condensate over said irregular surfaces by centrifugal force.

ARTHUR G. McKEE.